United States Patent
Wu et al.

(10) Patent No.: US 7,826,574 B2
(45) Date of Patent: Nov. 2, 2010

(54) MULTI-MODE RECEIVER WITH ADAPTIVE MODE SELECTION

(75) Inventors: Huan Wu, Kanata (CA); Sean Simmons, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 891 days.

(21) Appl. No.: 11/671,284

(22) Filed: Feb. 5, 2007

(65) Prior Publication Data
US 2008/0187076 A1    Aug. 7, 2008

(51) Int. Cl.
H04B 7/02    (2006.01)
H04L 1/02    (2006.01)

(52) U.S. Cl. .................. 375/349; 375/267; 375/347

(58) Field of Classification Search ............ 375/260, 375/267, 343, 346, 347, 349, 350
See application file for complete search history.

(56) References Cited

U.S. PATENT DOCUMENTS

| | | | | |
|---|---|---|---|---|
| 6,128,355 | A * | 10/2000 | Backman et al. | 375/347 |
| 6,944,139 | B1 * | 9/2005 | Campanella | 370/315 |
| 2004/0229581 | A1 * | 11/2004 | Mizoguchi et al. | 455/136 |
| 2005/0163261 | A1 * | 7/2005 | Nakao et al. | 375/343 |
| 2005/0215214 | A1 * | 9/2005 | Moorti et al. | 455/193.1 |
| 2006/0083195 | A1 | 4/2006 | Forenza et al. | |
| 2007/0041473 | A1 * | 2/2007 | Chen et al. | 375/329 |

FOREIGN PATENT DOCUMENTS

| | | |
|---|---|---|
| EP | 1 643 661 A | 4/2006 |
| JP | 11 284554 A | 10/1999 |
| KR | 2006-22630 | 3/2006 |
| WO | WO 01/59945 A | 8/2001 |
| WO | WO 2005/088864 A | 9/2005 |
| WO | WO 2006/125316 A | 11/2006 |

OTHER PUBLICATIONS

Software Antenna with Algorithm Diversity (Dec. 31, 2002) www.ursi.org/Proceedings/ProcGA02/papers/p0483.pdf.
English Language Translation of Notice Requesting Submission of Opinion dated Oct. 28, 2009 issued in respect of corresponding Korean Patent Application No. 10-2008-0011651.

* cited by examiner

*Primary Examiner*—David B Lugo

(57) ABSTRACT

Receivers and methods are provided that include multiple modes of processing signals from multiple antennas. These include legacy, SAIC (single antenna interference cancellation) and MSRD. Various methods are provided for selecting an appropriate receiver processing function. These include looking at correlation and gain imbalance between antennas, looking at the processing gain resulting from one or more of the receiver processing functions, and looking at the equalization quality of at least two receiver processing functions.

21 Claims, 3 Drawing Sheets

MULTI-MODE RECEIVER WITH ADAPTIVE MODE SELECTION

FIELD OF THE APPLICATION

The application relates to receivers having multi-mode capability, specifically including single antenna and multiple antenna modes.

BACKGROUND

As part of the constant evolution of the GSM/EDGE Radio Access Network (GERAN), the legacy GSM/EDGE receiver has been enhanced by the Downlink Advanced Receiver Performance (DARP) technologies that are being standardized by the 3GPP.

The so-called legacy receiver is a one antenna receiver that applies to 8 PSK (8 phase shift keying) modulation and GMSK (Gaussian Minimum shift keying) modulation.

One of the advanced technologies is referred to as Single Antenna Interference Cancellation (SAIC). This has been implemented in the so-called DARP-I receiver that is already in the 3GPP TS 45.005 standard. This approach only applies to GMSK (Gaussian minimum shift keying) modulation. The RF receive chain is substantially the same as in the legacy receiver featuring a single antenna. However, some advanced signal processing techniques are employed to make the receiver appear to have multiple antennas, referred to as virtual antennas since in fact there is only one physical antenna. This is achieved in part by over-sampling the received signal. More specifically, two samples per received symbol are taken instead of just one.

Another of these technologies is referred to as Mobile Station Reception Diversity (MSRD), and this is in the final phase of the standardization. This approach uses two receive antennas, and applies to both 8-PSK and GMSK modulations. Over-sampling is also performed with this approach.

BRIEF DESCRIPTION OF THE DRAWINGS

Embodiments will now be described with reference to the attached drawings in which.

DETAILED DESCRIPTION OF THE EMBODIMENTS

Figure 1:
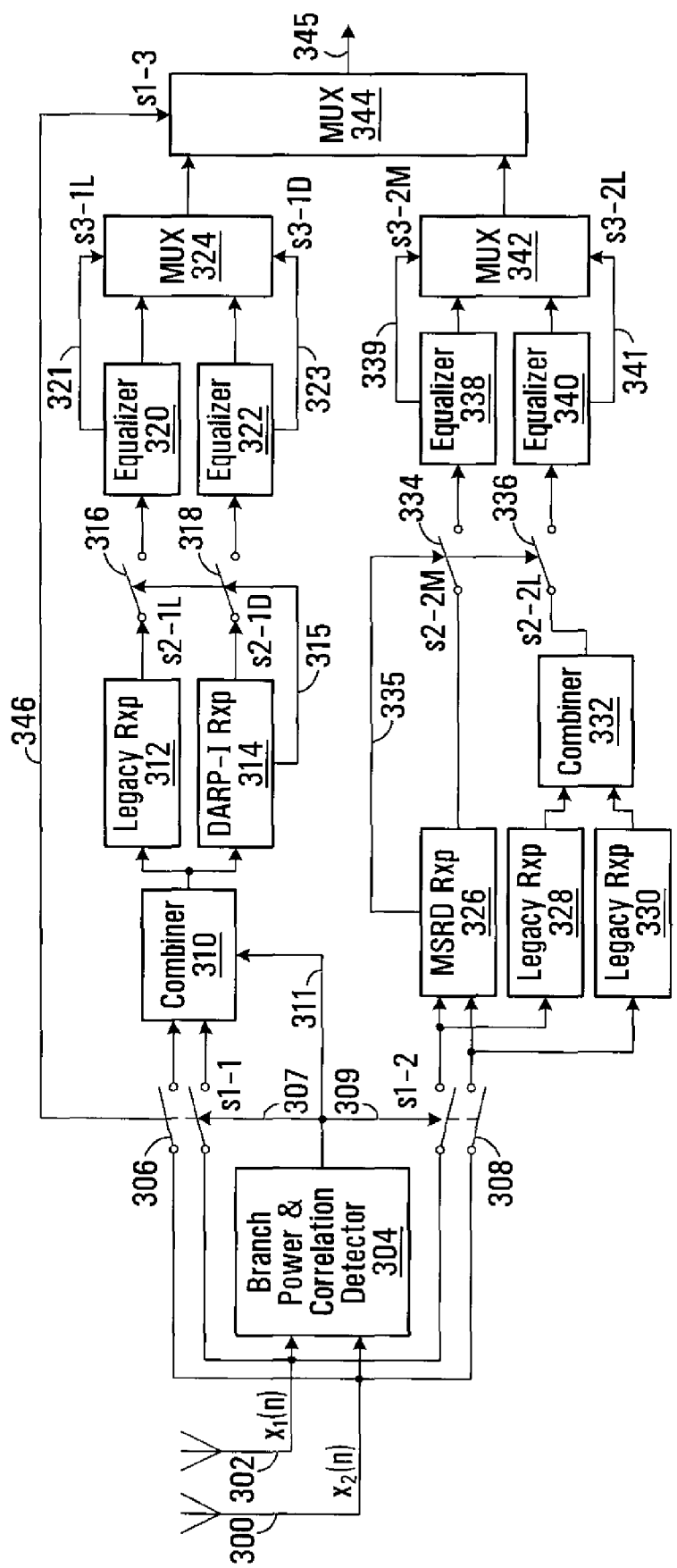
FIG. 1 is a block diagram of an example receiver.

An embodiment provides a receiver comprising:
two antennas;
a plurality of receiver processing functions for processing one or more signals received over the two antennas or combinations thereof; and
at least one of:
a) a branch power detector operable to determine a power of each signal; and
b) a correlation detector operable to determine a correlation between signals received on the two antennas;
wherein the receiver is operable to select a selected receiver processing function by taking into account an imbalance in the powers of the signals and/or by taking into account the correlation.

Another embodiment provides a method comprising:
receiving a respective signal on each of two antennas;
determining a power of each signal;
determining a correlation between the signals;
selecting a selected receiver processing function of a plurality of receiver processing functions by taking into account an imbalance in the powers of the signals and/or by taking into account the correlation; and
producing an output using the selected receiver processing function.

Another embodiment provides a method comprising:
receiving a respective signal on each of a plurality of antennas;
selecting a selected receiver processing function from a plurality of receiver processing function as a function of any one or a combination of:
a) correlation and gain imbalance between antennas;
b) the processing gain resulting from one or more of the receiver processing functions;
c) the equalization quality of equalized outputs of at least two receiver processing functions.

The advanced technologies (DARP-I and MSRD) have their own limitations and do not always perform significantly better than the legacy receiver. In addition, DARP-I and MSRD receiver processing functions do not always perform equally well.

Specifically, the DARP-I receiver only works for GMSK modulation and it works well in interference dominant scenarios. In AWGN (additive white Gaussian noise) dominant situations, the DARP-I receiver actually causes losses compared to the legacy receiver.

The MSRD receiver relies on two reception antennas. It works well when the two antennas are gain balanced and de-correlated. When the two antennas are highly imbalanced (e.g. one of them is malfunctional) or are deeply correlated, its performance is worse than that of the legacy receiver or the DARP-I receiver.

A set of comprehensive techniques built into a receiver are provided that selects a receiver processing function with the best potential performance for a certain scenario. These techniques can be applied burst by burst.

Front end Power Imbalance Determination and Correlation Detectors

In some embodiments, at the front of the receiver before much has been done, signals received on two reception antennas are processed to identify whether the MSRD receiver is appropriate or not. More specifically, one or both of the following are performed:

A) The receive power of each antenna is determined as a measure of imbalance between the two antennas in order to identify the situation of highly imbalanced antennas.

B) A correlation coefficient between signals received on two antennas is computed to identify the situation of deeply correlated antennas.

The correlation coefficient and/or the imbalance are processed to determine whether or not to disable the MSRD receiver. In a specific example, when the gain imbalance, measured for example by a ratio between powers received on the two antennas, is greater than a first threshold, the MSRD receiver is disabled. In another example, when the correlation coefficient exceeds a second threshold, the MSRD receiver will be disabled.

More generally, there may be two or more antennas. The receive power and/or correlation coefficient can be used to select between one of a plurality of receiver processing functions and/or to select between one and all of the antennas and/or receiver processing functions, or to select particular subsets of antennas and/or receiver processing functions. It is of particular use to de-select any receiver processing function that processes multiple antenna signals, and that relies on gain balance and/low correlation to achieve good results.

Receiver Processing Function Selection Based on Modulation Format

In some embodiments, when the MSRD receiver is not selected, one of the DARP-I or the legacy receivers will be activated depending on the modulation format. In a specific example, a legacy receiver is selected for 8-PSK modulation, and a DARP-I receiver is selected for GMSK modulation.

More generally, where the received signal may have one of multiple different modulation formats, the modulation format can be used to select or de-select on or more receiver processing functions.

Processing Gain Comparison

Both the DARP and the MSRD receivers have an adaptive space-time 2-D filter before channel equalization. See for example FIGS. 3 and 4 described below. The input signal-to-noise ratio (SNR) and the output SNR ratio of the space-time 2-D filter are determined as metrics (in dB) for the filter. The filtering gain is the difference between the output SNR and the input SNR. This difference is a measure of the performance improvement introduced by the DARP-I or MSRD receiver.

As a function of this filtering gain, the output of the DARP-I or MSRD receiver processing functions will be de-selected in favour of a legacy receiver processing function output or not. For example, if the gain is less than a threshold, the legacy receiver processing function output may be selected.

Assuming a DARP-I receiver processing function is enabled, the DARP receiver processing function will perform poorly in AWGN dominant conditions as opposed to interference dominant conditions. The AWGN conditions will result in poor filter gain and the subsequent selection of the legacy receiver processing function output. A low filtering gain will reflect poor performance generally. It is not necessary to know the cause of the poor performance, but of course, it may have been due to AWGN dominant conditions.

In addition, this approach can be used to provide side information for the selection/de-selection of the MSRD receiver processing function. More specifically, in some embodiments, the filtering gain is used in combination with the antenna gain imbalance and/or correlation coefficient to decide whether or not to de-select MSRD in favour of the legacy receiver processing function.

More generally, where multiple receiver processing functions are each processing one or more received signals in parallel, one or more of the processing functions can be selected or de-selected on the basis of filtering gain of one or more of the receiver processing functions.

Post-Equalization Comparison

In some embodiments, two or more of the receiver processing functions, are executed on the received signals, and a separate channel equalization is applied to the output of each receiver processing function. In the specific example of FIG. 1, equalization is applied to MSRD and Legacy receivers, or equalization is applied to DARP-I and legacy receivers, but DARP-I and MSRD are not implemented together. More generally, the particular combination of receivers for which equalization is performed is implementation specific. The best equalization output according to some metric is selected.

In some embodiments, more than one of the receiver processing functions are executed, and a respective equalization output produced. The best receiver processing function is then selected. In this case, the best result is always achieved, at least from the perspective of the metric used.

In some embodiments, the qualities of the soft decision outputs of the equalizers are used as the metrics that are compared. The equalizer output having soft decisions with the highest quality is selected as the output of the receiver. One of indicators of the quality of the soft decisions is the Unreliable Soft decisions Count (USDC) which is described in commonly assigned co-pending U.S. application Ser. No. 11/564,953 filed on Nov. 30, 2006 hereby incorporated by reference in its entirety. More generally, any method of determining the quality of the equalizer outputs can be employed. However, the USDC can be more computational attractive and consistent than other methods, e.g., the training sequence based BER estimation and SNR estimation. In some embodiments, this approach can be enabled or disabled as a function of whether or not the additional computational load of executing two or more receiver processing functions is acceptable.

In some embodiments, one or more of the receiver processing functions is eliminated using one of the methods described previously. The equalizer outputs of the remaining receiver processing functions are compared. In one specific example, the MSRD receiver may be eliminated after performing the gain imbalance analysis and or the correlation analysis. When this is the case, the qualities of the equalized signals produced by the legacy and DARP receiver processing functions may be compared, and the better quality result selected.

In another specific example, assuming MSRD has not been disabled, legacy processing is performed in parallel with the MSRD, and the best output is selected based on equalization quality.

In another specific example, one or more of the receiver processing functions may be eliminated using the processing gain analysis approach described above. In one specific example, the DARP receiver or the MSRD receiver output may be eliminated after performing the processing gain analysis. There is no need to examine the quality of an equalized signal produced by an eliminated receiver processing function.

It is noted that, in general, the transmitter does not need to be aware of what receiver processing function is being implemented in the receiver. However, that is not to say that receiver processing function selection has no effect upon network operation. Typically, receivers feedback information to the network to allow selection of transmit parameters such as transmit power, channel coding and modulation format among others. An example of such feedback information is downlink channel quality. The methods described herein can result in an improved effective downlink channel quality that, when fed back to the network, can allow the network to transmit with reduced power, and/or more efficient channel coding and modulation formats all of which may impact network capacity for the better.

A specific circuit that incorporates all of the above embodiments will now be described with reference to FIG. 1. Two antennas 300, 302 are shown functionally interconnected to a branch power and correlation detector 304. The antennas 300, 302 are also functionally interconnected with a combiner 310 through a switch 306. The switch 306 is controlled to be open or closed as a function of results produced by the branch power and correlation detector 300 as indicated by control path 307 carrying control signal s1-1. The combining performed by the combiner 310 is controlled as a function of results produced by the branch power and correlation detector 304 as indicated by control path 311.

An output of the combiner 310 is connected to both a legacy receiver processing function (Rxp) 312 and DARP-I Rxp 314. The output of the legacy Rxp 312 is connected through switch 316 to an equalizer 320. The output of DARP-I receiver 314 is connected through switch 318 to an equalizer 322. Switches 316 and 318 have their open and closed states controlled as a function of resulting processing gain of the DARP-I Rxp 314 as indicated by control path 315 carrying control signals s2-1L and s2-1D.

Equalizers 320,322 have respective outputs connected to a multiplexer (MUX) 324. Also shown is a control path 321 carrying control signal s3-1L between equalizer 320 and the multiplexer 324, and a control path 323 carrying control signal s3-1D between equalizer 322 and the multiplexer 324. The output of the multiplexer 324 is connected as an input to multiplexer 344. Multiplexer 324 operates to pass the output of a selected one of the equalizers 320,322 on to the multiplexer 344.

The antennas 300,302 are also functionally connected to MSRD Rxp 326, and to respective legacy Rxp 328,330 through switch 308. The switch 308 is controlled as a function of results produced by the branch power and correlation detector 304 as indicated by control path 309 carrying control signal s1-2. The MSRD Rxp 326 has an output connected through switch 334 to an equalizer 338. The two legacy Rxps 328, 330 have respective outputs connected to inputs of a combiner 332. The combiner produces an output that is connected through switch 336 to another equalizer 340. Switches 334 and 336 have their open and closed states controlled as a function of the processing gain of the MSRD Rxp 326 as indicated by control path 335 carrying control signals s2-2M and s2-2L.

Equalizers 338,340 have respective outputs connected to a multiplexer (MUX) 342. Also shown is a control path 339 carrying control signal s3-2M between equalizer 338 and the multiplexer 342, and a control path 341 carrying control signal s3-2L between equalizer 340 and the multiplexer 342. The output of the multiplexer 342 is connected as an input to multiplexer 344. Multiplexer 342 operates to pass the output of a selected one of the equalizers 338,340 on to the multiplexer 344.

Multiplexer 344 operates to pass the output of one of the multiplexers 324,344 on to a main output 345. Control path 346 carrying control signal s1-3 from the branch power and correlation detector 304 is used to control which multiplexer output is passed on. In particular, if switch 306 is closed and switch 308 is open, then the output of multiplexer 324 is selected by multiplexer 344. If switch 306 is open and switch 308 is closed, then the output of multiplexer 342 is selected by multiplexer 344.

Figure 2:
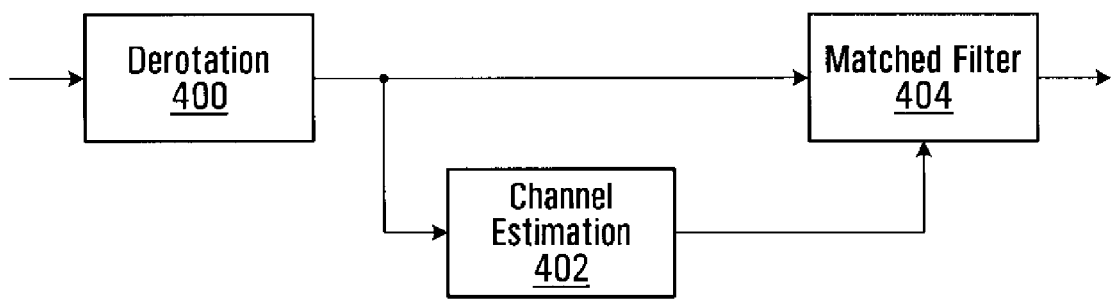
FIG. 2 is a block diagram of a legacy receiver processing function.

With reference to FIG. 2, an example of a typical legacy Rxp consists derotation 400 followed by a matched filter 404 performed as a function of channel estimation 402. More generally, a legacy receiver processing function will include at least a matched filter and channel estimation, not necessarily connected exactly as shown.

Figure 3:
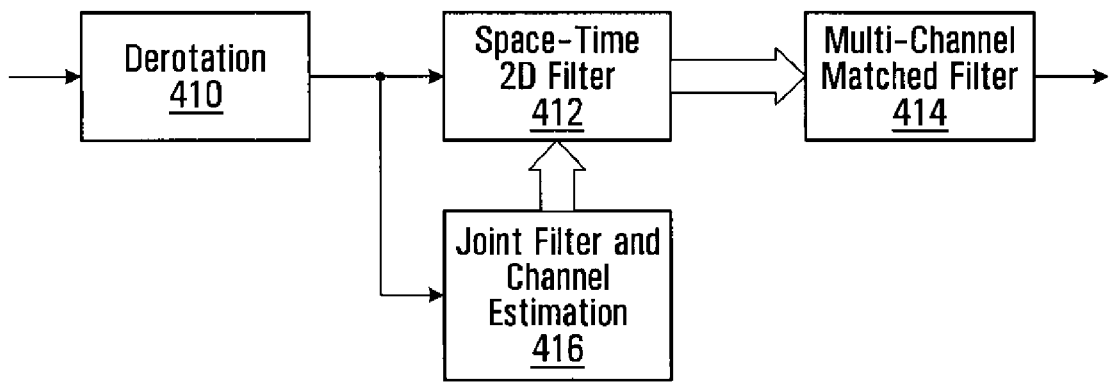
FIG. 3 is a block diagram of a DARP-I receiver processing function.

An example of the DARP-I processing is shown in FIG. 3. A specific implementation is described in commonly assigned co-pending U.S. application Ser. No. 11/420,254 filed on May 25, 2006 hereby incorporated by reference in its entirety. This involves derotation 410 followed by space-time 2D filtering 412 as a function of joint filter and channel estimation 416, followed by multi-channel matched filtering 414. More generally, an SAIC processing function, of which a DARP-I receiver processing function is a specific example, can be used.

It should be apparent that for the specific examples of FIGS. 2 and 3, the derotation function 400,410 could be implemented once in a system including both legacy and DARP-I receiver processing functions.

Figure 4:
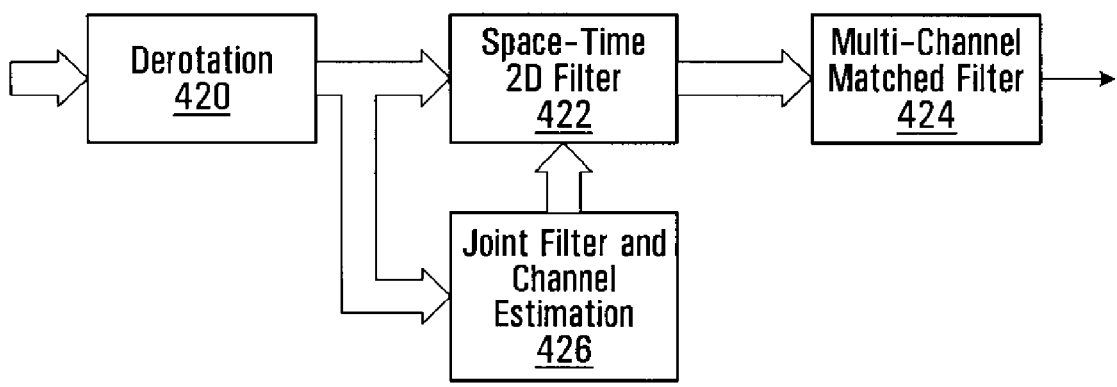
FIG. 4 is a block diagram of a MSRD receiver processing function.

An example of the MSRD Rxp is shown in FIG. 4. This involves de-rotation 420 followed by space-time 2D filtering 422 as a function of joint filter and channel estimation 426, followed by multi-channel matched filtering 424. The parallel lines in FIG. 4 (output of 420) versus the non-parallel lines in FIG. 3 (output of 410) indicate multiple signal paths from multiple antennas as opposed to a single signal path from a single antenna. More generally, the components may not necessarily be connected exactly as shown.

In operation, digitized baseband signals from the two antennas 300,302 are $x_1(n)$ and $x_2(n)$ respectively. The power of and the correlation between the two branches are calculated in the branch power and correlation detector 304 as:

$$P_1 = \frac{1}{N}\sum_{n=0}^{N-1}|x_1(n)|^2, \; P_2 = \frac{1}{N}\sum_{n=0}^{N-1}|x_2(n)|^2 \quad (1)$$

$$R_{12} = \frac{\frac{1}{N}\sum_{n=0}^{N-1}x_1(n)x_2^*(n)}{\sqrt{P_1 P_2}} \quad (2)$$

where $P_1$ and $P_2$ are the power estimations of the branches and $R_{12}$ is the correlation estimation between the branches. N is the number of samples available in a burst.

If $P_1/P_2 < T_p$ (assuming $P_1 \leq P_2$, and $T_p$ is a predetermined threshold), the switch 306 is turned on (s1-1=1) and the switch 308 is turned off (s1-2=0). This is the case where the two antennas are deeply imbalanced and the MSRD processing is considered not necessary. The combiner 310 in this case picks the stronger signal for further processing.

If $R_{12} > T_r$, where $T_r$ is a predetermined threshold, the two antenna paths are highly correlated and the MSRD processing will not bring any gain. The positions of the switches are the same as those in the power comparison case above. In this case, the combiner 310 performs a simple summation of the two branches assuming the two branches are coherent and the initial phase difference is corrected. The signal-to-noise-ratio (SNR) will be improved by 3 dB after the combining.

In the case of an 8 PSK-modulated signal, only a legacy receiver processing will be carried out. The switch 316 is turned on (s2-1L=1) and switch 318 is turned off (s2-1D=0). The legacy Rxp's output is fed to the equalizer 320 which generates the soft decisions for the next block processing (FEC decoding, etc.) (not shown).

In the case of a GMSK-modulated signal, both the legacy Rxp 312 and the DARP-I Rxp 314 will be operational. If the processing gain of the DARP-I (the gain of the output SNR over the input SNR of the DARP-I Rxp) is below a predetermined threshold, the output of the DARP-I Rxp 314 is discarded by turning off the switch 318 (s2-1D=0) and the legacy Rxp output will go through the equalizer and to the final output. Otherwise, both the switch 316 and switch 318 will be turned on (s2-1L=1, s2-1D=1) and the respective Rxp outputs will be equalized by equalizers 320,322. Only one of the outputs from the equalizers 320,322 will be selected by comparing the quality of the soft decisions generated by the equalizers. The one with the higher quality (for example the one with the lower USDC as described previously) is selected as the final output 345. The control signals s3-1L and s3-1D shown in the figure represent the quality of the outputs generated by the equalizers 320, 322 respectively.

Similar selection logic is provided for the MSRD receiver processing that occurs when switch 308 is closed and switch 306 is open. The two separate legacy Rxps 328,330 process respective signals from the two antennas 300,302. The outputs of the two legacy Rxps 328,330 are combined in combiner 332. When the SNR gain from the MSRD Rxp 326 is below a predetermined threshold, the switch 336 for legacy Rxp is on (s2-2L=1) and the switch 334 for MSRD Rxp 326 is off (s2-2M=0) and the output of the combiner 332 only is fed to equalizer 340. Otherwise both switches 334,336 are turned on and the output of the MSRD Rxp 326 is fed to equalizer 338, and the output of combiner 332 is fed to equalizer 340. The quality of the soft decisions produced by equalizers 338,340 is evaluated and the one with better quality is the final selection passed only the multiplexer 342. Again the USDC can be used in the evaluation in which case control signals s3-2M and s3-2L shown in FIG. 1 represent the USDC values for the soft decisions of the two equalizers 338,340.

In the above description, there are many references to selecting a receiver Rxp. This can mean selecting one of several outputs that are all produced by respective receiver processing functions operating in parallel or in sequence. An example of this is performing selection based on the equalization metric—a respective metric is produced for at least two receiver processing functions both of which are executed, and a single output is selected. This can also mean selecting one or more of several receiver processing functions to produce one or more outputs, and that the remaining receiver processing functions are disabled/do not operate. An example of this is the disablement of the MSRD processing function on the basis of the correlation or gain imbalance. No output is ever produced for that receiver processing function for that selection period. In any event, the final selection of a particular receiver processing function means that the output of that receiver processing function is kept for further processing notwithstanding whether other receiver processing functions are operated in parallel, but not selected.

The overall process of selecting can involve multiple steps some of which may involve de-selecting particular receiver processing functions. A de-selected receiver processing function is eliminated from being a candidate to produce the final output. In some embodiments, there is a process of elimination whereby certain techniques are used to de-select one or more receiver processing functions, and then one or more other techniques are used to select from any remaining receiver processing functions. For example, the branch power and correlation detector can be used to perform a de-selection of the MSRD processing function, with other approaches being used to choose between legacy and DARP-I.

In another example of de-selection, the processing gain in the DARP-I or MSRD receiver processing function can be used to effectively de-select that path. In that case, for the particular example of FIG. 1, there will only be one remaining path that gets selected by process of elimination.

Specific examples of receiver processing functions have been described above. More generally, the techniques described herein can be applied to any receiver processing functions. Each receiver processing function is operable to produce a signal for equalization. The specific examples of FIGS. 2,3,4 involve channel estimation (be it conventional or joint filter and channel estimation) and matched filtering (be it conventional or multi-channel), and examples of FIGS. 3 and 4 include space-time 2D filtering.

While the receiver processing functions are described as being for processing certain desired types of signals, it is to be understood that noise and/or interference components are also usually present. The interference components within desired PSK or GMSK signal may include other PSK components and/or GMSK components. These receiver processing functions described include:

the MSRD receiver processing function capable of processing two or more antenna signals that are comprise 8 PSK and/or GMSK components; more generally, one or more receiver processing functions capable of processing two or more antenna signals that are composed of 8 PSK or GMSK components may be provided; more generally still, one or more receiver processing functions capable of processing at least two signals are provided;

the legacy receiver processing function capable of processing one PSK signal or one GMSK signal; more generally one or more receiver processing functions capable of processing one PSK or one GMSK signal may be provided; more generally still, one or more receiver processing functions capable of processing a single signal are provided; the single signal may be from a single antenna, or be produced by combining multiple antenna signals, for example by selection or adding;

the DARP-I receiver processing function capable of processing one GMSK signal; more generally, one or more receiver processing functions may be provided that are capable of processing one GMSK signal; the single signal may be from a single antenna, or be produced by combining multiple antenna signals, for example by selection or adding;

the combination of legacy receiver processing functions that each process a respective 8 PSK or GMSK signal, and a combiner for combining legacy receiver processing function outputs and that collectively allow for processing of multiple 8 PSK or GMSK signals.

The methods described have been shown in the context of specific methods of selecting between these specific receiver processing functions. More generally, it is to be understood that the particular receiver processing functions included is implementation specific. This may include zero, one or more, or all of the specific receiver processing functions referred to above. Furthermore, the techniques described may be applied to different permutations of the described receiver processing functions than those specifically disclosed.

In the illustrated examples, the receiver processing functions are implemented as hardware. However, more generally, the receiver processing functions may be implemented as hardware, firmware, software, or any appropriate combination thereof. Moreover, it is to be understood that the components described herein may be implemented as hardware, firmware, software, or any appropriate combination thereof.

In the illustrated examples the selection is performed step by step, with various outputs controlling various switches, and no centralized control. In another embodiment, a control function, implemented in hardware or software, is provided that takes some or all of the decision variables (antenna gains, correlations, processing gains, equalization qualities) and participates in the making of, or makes, the decision on the receiver processing function selection.

Mobile Device

Figure 5:
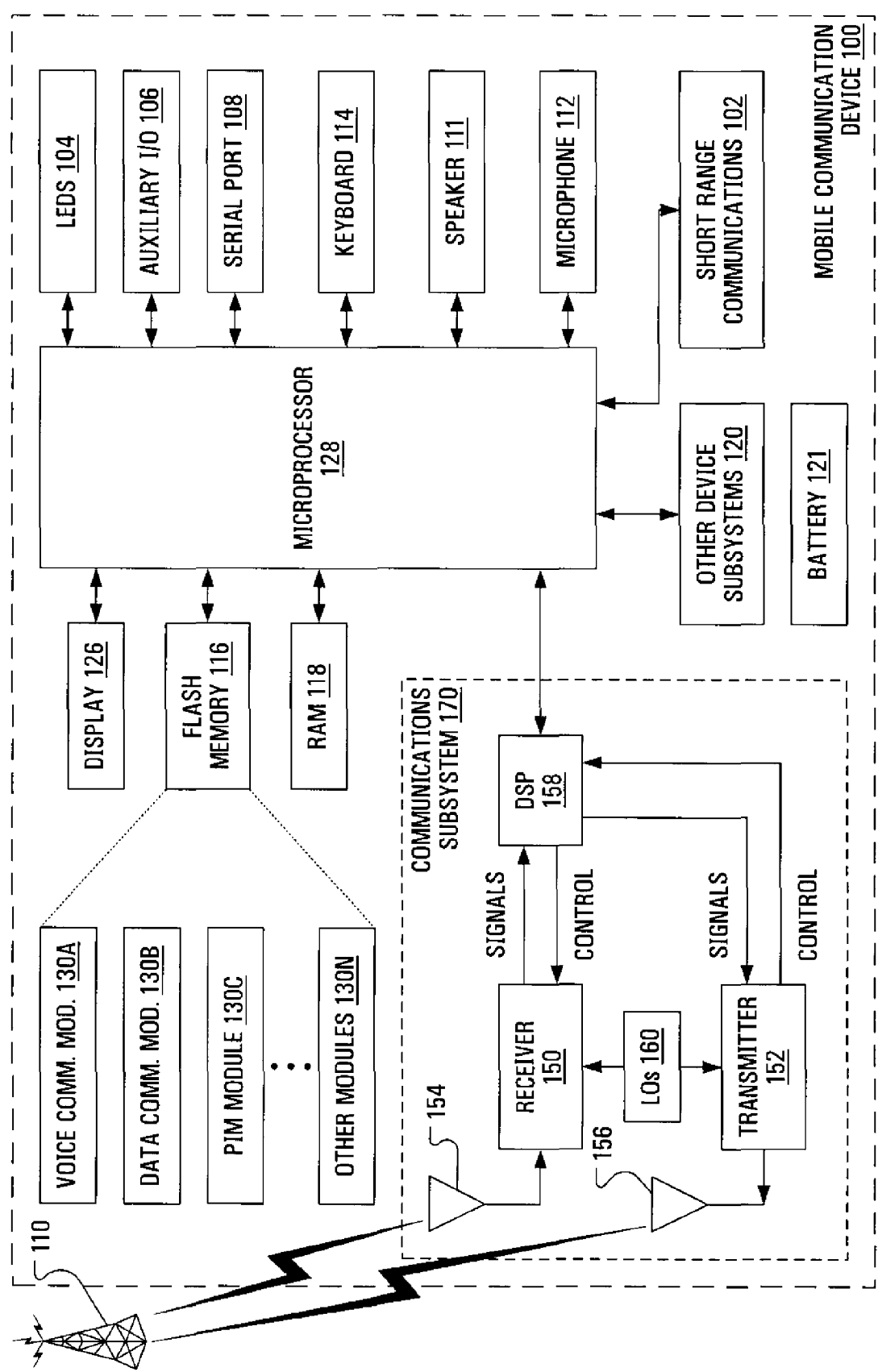
FIG. 5 is a block diagram of an example mobile device.

The receiver circuit disclosed herein may be implemented in a mobile device. Referring now to FIG. 5, shown is a block diagram of an example mobile device 100. The mobile device 100 is not shown with components specific to the receiver circuit disclosed herein above; however, it is to be understood that the receiver circuit may be implemented in the mobile device 100. It is also to be understood that the mobile device 100 is shown with very specific details for example purposes only.

A processing device (a microprocessor 128) is shown schematically as coupled between a keyboard 114 and a display 126. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features of the receiver processing functions described herein above.

Communication functions, including data and voice communications, are performed through the communication subsystem 170, and possibly through the short-range communications subsystem 120. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 can be implemented to include components for the receiver circuit described herein above. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present invention are possible in light of the above teachings. It is therefore to be understood that within the scope of the appended claims, the invention may be practiced otherwise than as specifically described herein.

We claim:

1. A receiver comprising:
   two antennas;
   a plurality of receiver processing functions comprising at least one receiver processing function for processing a single signal and at least one receiver processing function for processing at least two signals; and
   at least one of:
   a) a branch power detector operable to determine a power of each signal received by each antenna and compare the power of each signal with the power of each other signal to determine a measure of imbalance in the powers of the signals; and
   b) a correlation detector operable to determine a correlation between signals received on the two antennas;
   wherein the receiver is operable to select a receiver processing function by taking into account at least one of:
   the measure of imbalance in the powers of the signals when compared to a threshold and the correlation when compared to a threshold.

2. The receiver of claim 1 wherein the receiver is operable to select the receiver processing functions by de-selecting at least one of the receiver processing functions when the imbalance is above a threshold.

3. The receiver of claim 1 wherein the receiver is operable to select the receiver processing functions by de-selecting at least one of the receiver processing functions when the correlation is above a threshold.

4. The receiver of claim 1 wherein the receiver is operable to select the receiver processing functions by de-selecting at least one of the receiver processing functions when the imbalance is above a threshold and by de-selecting at least one of the receiver processing functions when the correlation is above a threshold.

5. The receiver of claim 1 wherein the receiver is further operable to select the receiver processing function by de-selecting at least one receiver processing function as a function of modulation type.

6. The receiver of claim 1 wherein:
   the receiver is further operable to select the receiver processing function by selecting between first and second receiver processing functions of said plurality of receiver processing functions as a function of modulation type by:
   selecting the first receiver processing function when the modulation type is 8-PSK; and
   selecting the second receiver processing function when the modulation type is GMSK.

7. The receiver of claim 1 wherein:
   the receiver is further operable to select the receiver processing function by de-selecting a receiver processing function of said plurality of receiver processing functions as a function of processing gain for the receiver processing function.

8. The receiver of claim 7 wherein:
   the receiver is further operable to select the receiver processing function by de-selecting a receiver processing function of said plurality of receiver processing functions as a function of processing gain for the receiver processing function by:
   determining a processing gain for one of a first and second receiver processing functions of said plurality of processing functions; and
   de-selecting the one of the first and second receiver processing functions if the determined processing gain is below a threshold.

9. The receiver of claim 1 further operable to select the receiver processing function by:
   performing receiver processing using at least two of the receiver processing functions;
   performing a respective equalization on an output of each of the at least two receiver processing functions to produce a respective equalized output; and
   determining a quality metric for each equalized output;
   selecting the receiver processing function according to the quality metrics.

10. The receiver of claim 9 wherein the quality metric is Unreliable Soft decisions Count (USDC).

11. The receiver of claim 7 further operable to select the receiver processing function by:
    performing receiver processing using at least two of the receiver processing functions;
    performing a respective equalization on an output of each of the at least two receiver processing functions to produce a respective equalized output; and
    determining a quality metric for each equalized output;
    selecting the selected receiver processing function according to the quality metrics.

12. The receiver of claim 1 wherein the plurality of receiver processing functions comprise:
    a receiver processing function for processing one 8PSK signal or one GMSK signal;
    a receiver processing function for processing one GMSK signal using single antenna interference cancellation; and
    at least one receiver processing function for processing two GMSK signals or two 8PSK signals.

13. The receiver of claim 12 wherein:
    the receiver processing function for processing one 8PSK signal or one GMSK signal comprises a legacy receiver processing function;
    the receiver processing function for processing one GMSK signal using single antenna interference cancellation comprises a DARP-I receiver processing function; and
    the at least one receiver for processing function for processing two GMSK signals or two 8PSK signals comprises an MSRD receiver processing function.

14. The receiver of claim 13 wherein the at least one receiver processing function for processing two GMSK signals or two 8PSK signals further comprises two or more legacy receiver processing functions for processing the two GMSK signals or two 8PSK signals and a combiner for combining outputs of the two legacy receiver processing functions.

15. A mobile device comprising the receiver of claim 1.

16. A method comprising:
receiving a respective signal on each of two antennas;
determining a power of each signal and comparing the power of each signal with the power of each other signal to determine a measure of imbalance in the powers of the signals;
determining a correlation between the signals;
selecting a receiver processing function of a plurality of receiver processing functions comprising at least one receiver processing function for processing a single signal and at least one receiver processing function for processing at least two signals by taking into account at least one of:
the measure of imbalance in the powers of the signals when compared to a threshold and the correlation when compared to a threshold; and
producing an output using the selected receiver processing function.

17. The method of claim 16 wherein selecting the receiver processing function further comprises:
selecting the receiver processing function by de-selecting at least one receiver processing function as a function of modulation type.

18. The method of claim 16 wherein selecting the receiver processing function further comprises:
executing one of the plurality of receiver processing functions and determining a processing gain achieved by the receiver processing function;
selecting the receiver processing function by de-selecting a receiver processing function of said plurality of receiver processing functions as a function of processing gain for that receiver processing function.

19. The method of claim 16 wherein selecting the receiver processing function further comprises:
performing receiver processing using at least two of the receiver processing functions;
performing a respective equalization on an output of each of the at least two receiver processing functions to produce a respective equalized output; and
determining a quality metric for each equalized output;
selecting the selected receiver processing function according to the quality metrics.

20. The method of claim 19 wherein determining a quality metric comprises determining an Unreliable Soft decisions Count (USDC).

21. A method comprising:
receiving a respective signal on each of a plurality of antennas;
selecting a receiver processing function from a plurality of receiver processing functions comprising at least one receiver processing function for processing a single signal and at least one receiver processing function for processing at least two signals as a function of any one or a combination of:
a) correlation and gain imbalance between antennas;
b) the processing gain resulting from one or more of the receiver processing functions;
c) the equalization quality of equalized outputs of at least two receiver processing functions.

* * * * *